United States Patent

Spain

[15] 3,699,550

[45] Oct. 17, 1972

[54] BINARY CODED INFORMATION STORES

[72] Inventor: Robert J. Spain, Needham Heights, Mass.

[73] Assignee: Compagnie Internationale Bur L'Informatique, Louveciennes, France

[22] Filed: Dec. 30, 1969

[21] Appl. No.: 889,096

[52] U.S. Cl. ................ 340/174 TW, 340/174 AC, 340/174 MC, 340/174 NA, 340/174 PW, 340/174 TF, 340/174 SR, 340/174 ZB

[51] Int. Cl. ............................................. G11c 11/02

[58] Field of Search ...340/174 TF, 174 SR, 174 TW, 340/179 TF, 179 SR, 179 TW, 179 AC; 336/135

[56] References Cited

UNITED STATES PATENTS

| | | | |
|---|---|---|---|
| 3,090,946 | 5/1963 | Bobeck | 340/174 SR |
| 3,083,353 | 3/1963 | Bobeck | 340/174 TW |
| 3,158,826 | 11/1964 | Beck | 336/135 |
| 3,518,643 | 6/1970 | Perweski | 340/174 TF |

OTHER PUBLICATIONS

Publication 1 – Instruments & Control Systems Vol. 34, July 1961 pg. 1242– 1245

Publication 11 – IEEE Transactions on Communications & Electronics, November 1964 pg. 829– 833

*Primary Examiner*—James W. Moffitt

*Attorney*—Kemon, Palmer & Estabrook

[57] ABSTRACT

A circulating or recirculating register of binary coded information is comprised of a helical magnetic film path formed over an elongated and preferably cylindrical member with the easy magnetization axis of the film oriented substantially perpendicularly to the axis of the cylinder, and the binary values of the information bits represented as reversed orientations of the magnetization vector along the helical path. The circulation is assured by application of a rotating magnetic field, the axis of which is parallel to the length of the cylinder. The stasis or interruption of circulation when needed is assured by application of an alternating magnetic field on substantially the same axis. In a plural register store such registers are grouped and merged within the said rotating magnetic field.

27 Claims, 13 Drawing Figures

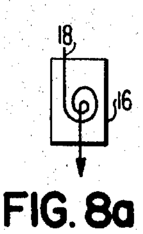
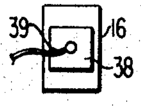
FIG. 8b
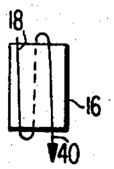
FIG. 8a FIG. 8c
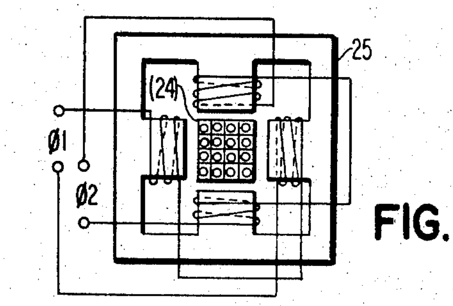
FIG. 9
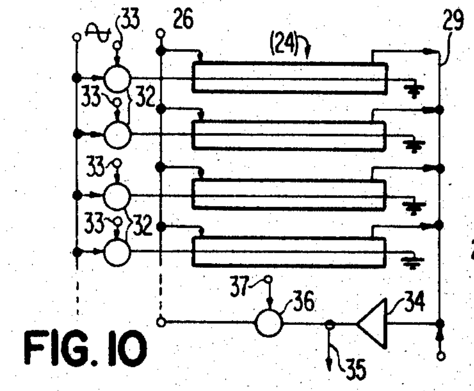
FIG. 10
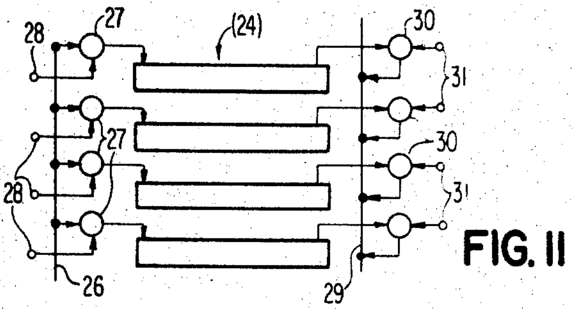
FIG. 11
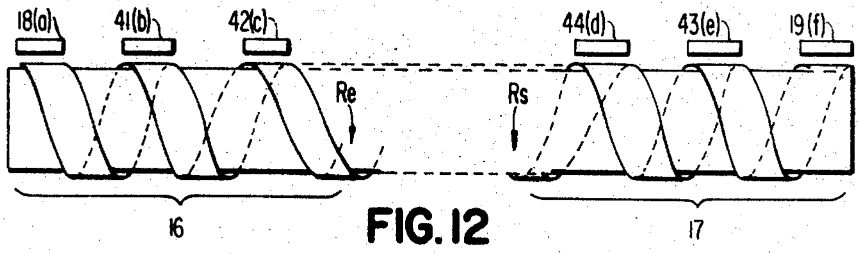
FIG. 12
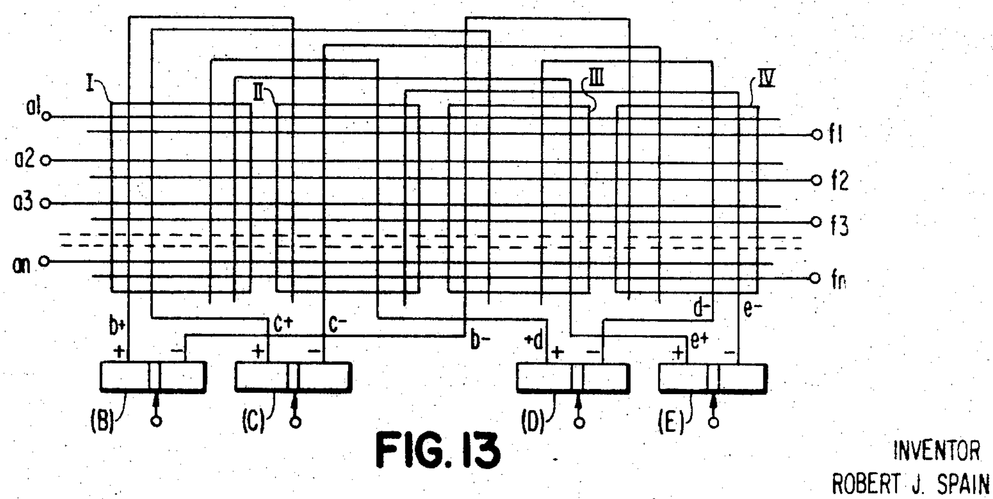
FIG. 13
INVENTOR
ROBERT J. SPAIN
BY
Kemon, Palmer & Estabrook
ATTORNEYS

BINARY CODED INFORMATION STORES

BACKGROUND OF THE INVENTION

The present invention concerns binary coded information stores of the kind wherein the binary values 0 and 1 of the bits are represented by reversed orientations of the magnetization vector along the easy axis of uniaxial anisotropy in a ferro magnetic film, and it more particularly concerns such stores which comprise magnetic film paths along which information may circulate when submitted to appropriate magnetic field controls.

An object of the invention is to provide a new structure of circulating or recirculating register for such stores which includes means for effecting both circulation and inhibition of circulation therein.

A further object of the invention is to provide from said circulating and recirculating register structures new and improved structures of multi-register stores having at least common circulation control means and selective circulation inhibition means.

A further object of the invention is to provide such circulating and recirculating register structures for such multi-register stores with individual means concurrently operating to select the registers for read-in and read-out operations in said stores.

BRIEF SUMMARY OF THE INVENTION

In accordance with the present invention a binary coded information store is formed by an assembly of a plurality of elementary stores each of which is formed of at least one helical film of anisotropic magnetic material formed on a smooth surfaced elongated and substantially cylindrical member.

BRIEF DESCRIPTION OF THE DRAWING

FIGS. 8*a*, 8*b* and 8*c* show some possible details for read-in and read-out arrangements in such elementary stores;

FIG. 9 shows an arrangement of a multi-register store according to the invention;

FIGS. 10 and 11 show two possible arrangements for selectively reading-in and reading-out such stores with no special provisions in the elementary registers thereof;

FIG. 12 shows an embodiment of a circulating register according to the invention provided with further means for read-in and read-out selection operations; and FIG. 13 shows an example of a multi-register store embodying elementary registers according to FIG. 12.

DETAILED DESCRIPTION OF THE DRAWINGS

Figure 1:
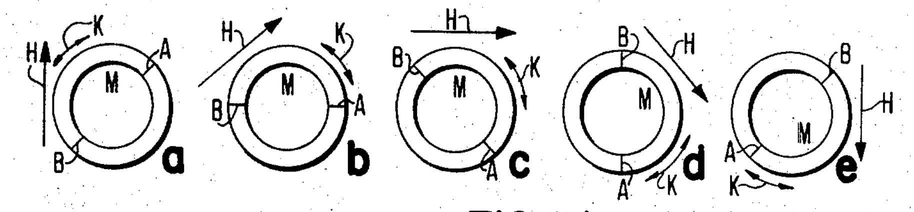
FIGS. 1*a*, 1*b*, 1*c*, 1*d* and 1*e* show the action produced by a rotating magnetic field on a thin anisotropic magnetic annulus having a portion thereof magnetized in an orientation reversed with respect to the remaining portion of the film.

Referring now first to FIG. 1, an annulus or ring formed as a thin ferromagnetic layer is shown, i.e., a film of uniaxial anisotropy, the easy magnetization axis of which is indicated by the double-arrow K. By means, unnecessary to describe at this point, the magnetization vector has had its orientation reversed between points A and B with respect to the remaining portion M of the ferromagnetic film. When a magnetic film in this condition is placed within a rotating magnetic field H on the same or at least substantially the same axis, the walls of the magnetic reversely orientated zone AB will be driven by said field to "circulation" around the ring as shown on views *a*) to *e*) inclusive of said FIG. 1.

Figures 2, 3A, 3B, 3C, 3D:
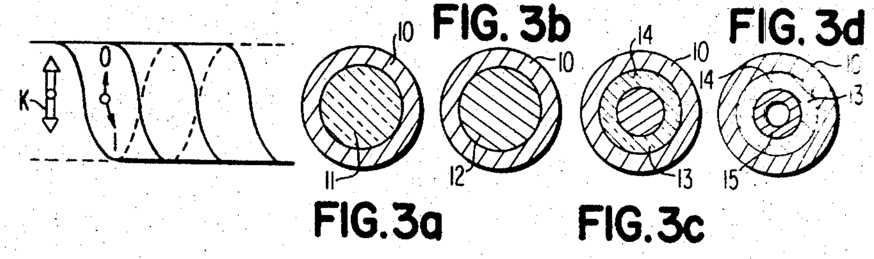
FIG. 2 shows a portion of a helical magnetic circulation path acted upon by a rotating magnetic control field.
FIGS. 3*a*, 3*b*, 3*c* and 3*d* show in cross-section views examples of circulating register structures according to the invention.

When arranging the thin anisotropic film in a helical path along the surface of a cylinder, as shown in FIG. 2, the easy magnetization axis K remains substantially perpendicular to the axis of said helix, as it was with respect of the axis of the magnetic annulus in FIG. 1. Applying a rotating magnetic field around the axis of the cylinder, a similar circulation effect is obtained as the walls of any zone having its magnetization reversed with respect to the adjacent zones along the helix are driven into displacement along the helix. Such a zone, representing for instance a bit of binary value "1, " from such reversal of orientation of its magnetization, will circulate along the helical path in a direction which is a function of both the orientation of the pitch in said helix and the orientation of the easy magnetization axis in the ferromagnetic material as compared with the direction of rotation of the external magnetic control field. It may be noted that the reversal of orientation of the zone to be circulated is not quite perfect since, as indicated by the arrow 1, it does not fully reach 180°. However, this is not at all deleterious and one must understand that in practical embodiments, the turns of the helix are formed with a nearly 90° slant with respect to the axis of the cylinder. For the sake of clarity, the slant is shown in the drawing as having higher values. It should also be noted that actually in FIG. 2 two portions of separate helices are shown to indicate that, if desired, more than one helical path may be provided on a single carrier. throughout, which may, for instance, be considered as defining zero binary value at each and any zone in the film.

In the present application, a film magnetic layer may have a thickness which lies between some hundreds to some thousands of Angstroms and is made of uniaxial anisotropic ferromagnetic material. Production of such films is well known per se and therefore does not require any detailed description herein. As is known, the axis of anisotropy may be ascertained either by application of a D.C. magnetic orienting field during the deposition of the layer, or after deposition by application of a magnetic field with simultaneous application of heat. Either way, a film of anisotropic magnetization is obtained with uniform orientation of magnetiZATION THROUGHOUT, WHICH MAY, FOR INSTANCE, BE CONSIDERED AS DEFINING ZERO BINARY VALUE AT EACH AND ANY ZONE IN THE FILM. Any reversal of the magnetization orientation which is locally produced thereafter will then be considered as placing a binary value "1" in the concerned zone.

For producing the circulating magnetic paths, one may have recourse to various practices. A helical path may be achieved, for instance, by the helical deposition of a magnetic material such as the well known iron-nickel-cobalt alloy. Preferably, however, one of the two following methods may be used. In the first one, the surface of a cylindrical carrier is coated with a thin layer of aluminum which is then etched according to the desired pattern of the path to be obtained. Thereafter a ferromagnetic alloy film, iron-nickel-cobalt for instance, is uniformly deposited over the aluminum film and the path which has been etched therein. In the second method, the surface of the carrier cylinder is uniformly coated with a film of a soft ferromagnetic material, such as an alloy of iron, nickel and cobalt. Then a thin non-magnetic helical path is formed over the first film, for instance in a photoetched resist, and this is followed by the deposition of a harder magnetic material, for instance a nickel-cobalt film over the entire surface.

The carrier member should have a surface which is very smooth and preferably approaching an optical polish. The carrier may be either a glass rod, as shown at 11 in FIG. 3*a*, or a metal rod 12, as shown in FIG. 3*b*. In the latter case the metal should preferably be electrolytically polished. It is preferred that the carrier have a conductive core as shown at 13, in FIG. 3*c* or 15, in FIG. 3*d* for purposes which will hereinafter be described. In FIG. 3*c* a conductor 14 is coated with a dielectric 13 on the surface of which is formed the magnetic path 10. In FIG. 3*d*, the conductor consists of a metallic coating 15 on the inner surface of a dielectric tube 13. By way of example, the diameter of the carrier may be of the order of one millimeter, the pitch of the magnetic helical path may be of the order of 200 microns and the width of the helical path of the order of 74 microns. The speed of propagation along the path obviously will be a function of the speed of rotation of the magnetic field and may reach a value of the order of 2 times $10^5$ cm/sec. The interval between two successive bit memory zones along the helix is substantially equal to one pitch of the helix. It is not imperative that the cross-section of the carrier be strictly circular, but may depart from a circle as long as the value of the rotating magnetic field is substantially constant throughout.

Figure 4:
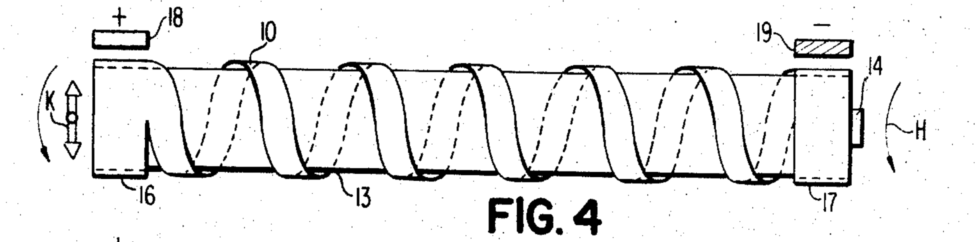
FIGS. 4 to 7 are plan views of illustrative embodiments of circulating and recirculating registers according to the invention, and each comprising an elementary magnetic store according to the invention.

FIG. 4 shows a first example of a magnetic circulating register, or elementary store, wherein a cylindrical elongated carrier is provided with a single helical magnetic path 10 which terminates in sections 16 and 17 of enlarged width which may, for instance, each substantially surround an end portion of the carrier. In close proximity to the end portions 16 and 17 are shown transverse conductors 18 and 19. Conductor 18 is for instance a read-in control conductor which means that each time it is activated by an electrical current representative of a binary digit "1," the orientation of the magnetization vector will be reversed at 16, for reading that bit into the register. The rotating magnetic field H which surrounds the structure will ensure the progression of said reversed orientation zone along the helical path up to the other end of said path, where the conductor 19 will "read out" that information bit before erasure. Consequently the structure duly acts as a circulating register imparting to each information bit a delay equal to the number of "cycles" of the rotating magnetic field necessary to bring a given bit from the input to the output end of the magnetic circulating path. The number of cycles is equal to the number of pitches of the helix. With the dimensions hereinbefore defined, the length of a cycle may easily be of the order of 2 microseconds.

When retention of information is required, two solutions may be provided, either separately or concurrently. First, circulating inhibiting means to inhibit the action of the rotating magnetic field may be provided within the register structure; and secondly, the structure is completed to provide for recirculation of the information. In either case, it is not contemplated to interrupt the rotating magnetic field, as this would be impractical.

Figure 5:
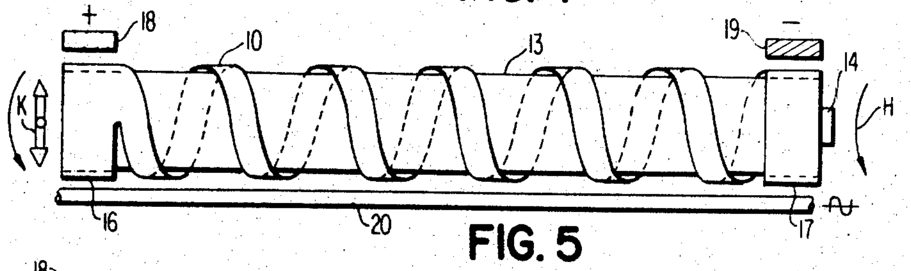

To inhibit the action of the rotating magnetic field, it is possible to apply an alternating magnetic field to the register. This may be effected by circulating an alternating electrical current in the inner conductor 14, or 15, when provided in the carrier, or in a separate conductor in close proximity to the path, for instance, as shown at 20 in FIG. 5. Alternating current is not applied during the time interval of reading a sequence of bits into the register, i.e., during the time interval necessary for the first read-in bit to reach the other end of the helical path. Also, alternating current will not be applied during a read-out of the content of the register.

In order to establish a recirculating register, the magnetic circulating path may be duplicated, either by coupling two single path elements or by superimposing two end-coupled magnetic paths on the same carrier member. The orientation of the helices are reversed so that progression of circulation and recirculation is ensured with a single rotating magnetic field.

Figure 6:
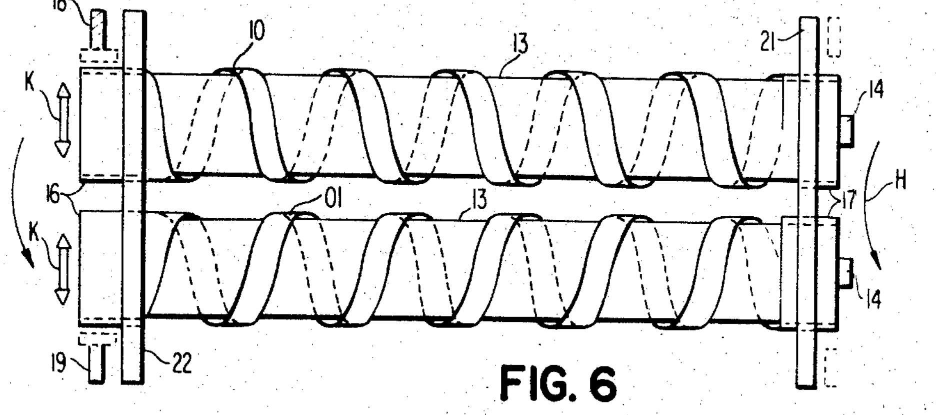

In the example of FIG. 6, two simple circulating registers have reversed orientation of their magnetic helical paths 10 and 01 and are coupled at their end sections by means of magnetic bridges 21 and 22, each extending transversely in close proximity to the ends of the paths and even contacting the end portions of the paths. When an information bit zone in path 10 reaches the point under bridge 21 at one cycle of rotation of the rotating magnetic field H, it is transferred to the input of magnetic path 01 wherein it will circulate in the opposite direction of displacement from that it had circulated in path 10. At the end section of path 01, the information bit will be transferred anew by the bridge 22 in the path 10, and so forth. Each one of the bridges such as 21 and 22 may consist of a uniaxial anisotropic magnetic film coated over a thin dielectric sheet and having its easy axis oriented along its geometrical length. Various possible locations of read-in and read-out conductors are further indicated in FIG. 6. It will be understood that, depending upon particular requirements, more than one read-in conductor and more than one read-out conductor may be employed with each circulating and/or recirculating register.

Instead of using magnetic shunts or bridges for coupling two circulating registers to make them act in pairs as a recirculating register, it may be possible to provide the desired coupling by means of external read-out and read-in control circuits by connecting a read-out conductor in a register to the read-in conductor of a further register. When such external interconnections are employed, both registers of a pair may be identically positioned with respect to their helical pitch orientations.

Figure 7:
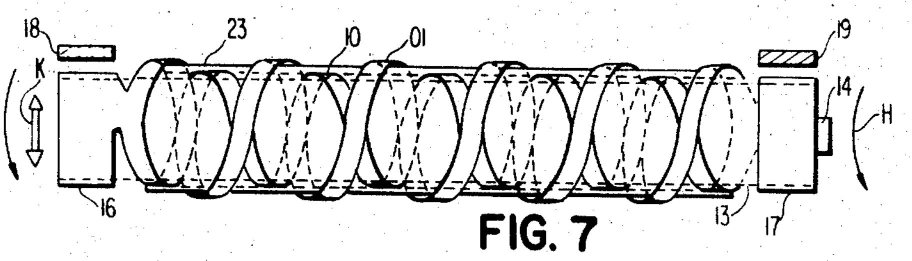

FIG. 7 shows an example of a recirculating register formed of two superimposed magnetic helical paths on a single carrier, with oppositely oriented helices. One of the paths 01 is separated from the "inner" path 10 by a thin insulating sheet or film 23 except at the end sections which are in direct contact from one path to the other.

In FIGS. 4 to 7 conductors 18 and 19 are shown as flat cross-section conductors but it will be understood that this representation is not at all limiting. Other configurations may be used as, for instance, those shown in FIGS. 8*a*, 8*b*, and *c*. In FIG. 8*a* conductor 18 is a flat spiral coil applied over the end section 16 of the magnetic path. In FIG. 8*b* the conductor is made as a thin metallization 38 of the end portion 16 with a wire 39 soldered thereon. In FIG. 8*c* conductor 18 is a thin insulated wire would around the end section 16, wound that the "output" 40 may be used for further read-in controls in further register structures (provided selection is made elsewhere). Flat loops oriented along the axis of the register member may also be used when required.

Conductor 14, shown in FIGS. 4 to 7 (which could have been conductor 15 instead) has a special advantage in this application. If a D.C. current is passed therethrough at the same time as a circulation inhibiting alternating current as referred to hereinabove, what amounts to a "bias" of the condition of the ferromagnetic material which favors the "0" magnetization orientation with respect to the reverse of "1" is effected. This assists in separating the reversed orientation of magnetization zones from the remaining zones wherein the orientation is not reversed. An increase of the D.C. current will also be effective to erase the content of the register whenever required. If the register structure proper does not include an inner conductor such as 14 or 15, additional external conductors may be provided but this latter arrangement would be more difficult to handle.

Even in a recirculating register, application of a circulation inhibiting A.C. component may be of advantage when it is desired to "freeze" the information content of the store at some particular time.

The circulating and/or recirculating magnetic registers which have been hereinabove described are used mainly to provide compact stores by grouping them in a stack as shown in a top plan view in FIG. 9. The stack or block thus obtained is placed in a rotating magnetic field which may be generated, as shown, by a pair of orthogonal windings counted on a magnetic yoke 25 and respectively fed with the two phases $\phi 1$ and $\phi 2$ of an A.C. two-phase supply.

Assuming the dimensions previously mentioned, and considering that within the block 24 the register members are spaced apart by about 1 millimeter, the volume density of the store will be about 5,000 information bits per cubic centimeter. For an overall capacity of $10^6$ bits, a volume of the order of a liter, the rotating magnetic field at a frequency of for instance 500Kilo Hertz needs only have a value of about 8 oersteds and the power of the electric supply needs only have a value of about 160 watts. The power value may be further reduced if desired by driving the winding coils through a resonance circuit, of the order of 6 watts and considering a Q factor of about 10 for such a resonant circuit.

In groups or blocks of elementary register stores, it is necessary to proceed with selection operations for read-in as well as for read-out of the information bits. FIG. 10 shows a selection, or interrogation, arrangement in or for a store in which A.C. inhibition is used. The alternating current is distributed in parallel relation to the registers of the block (24) through gates 32 provided with control inhibition inputs 33. The information input 26 reaches the inputs of all the registers and the read-out amplifier 34 is connected to all outputs 29 of said registers. The read-out information issues at 35 at the output of amplifier 34. Use of an additional gate 36 provided with an authorization input 37 is effective to take the output from 34 and return it to the input information line bus 26. The operation may be explained as follows.

With all transfer stages 32 conducting, alternating current is applied to each of the elementary register stores (24) and consequently all information therein is maintained stationary, and line 29 does not read out any information. For a read-out operation, the selection is made by inhibiting one of the transfer gates 32, which stops the application of alternating current to the selected register thus cancelling the circulation inhibiting magnetic field for that register. The information content of that register circulates and consequently at the read-out end of its helical path, successive corresponding signals are formed in the output line 29 and the signals are amplified at 34 and picked off at 35. When, for mere circulating registers in the block (24), the read-out content must be immediately re-read-in the same register, the selection of the gate 32 is maintained, and the gate 36 is placed in conducting condition which re-applies the signals through bus line 26 to the read-in "head" of the selected register, inhibition being maintained on the other register inputs due to retained application of alternating current. A read-in operation is similarly conducted, but this gate 36 is blocked and the input bus line 26 receives the codes to be registered in the selected and then circulating register. When recirculating registers are used, gate 36 is omitted as well as the feedback line from the output of 34 to bus line 26. Erasure may be effected as hereinbefore described by any increase of direct current in any register. As will be apparent, conductors 14 may be selected for such purpose by a direct current gate selection arrangement.

Interrogation and read-in and read-out operations may also be assured from an entirely external organization, i.e., in a conventional fashion as indicated in FIG. 11. Here there are as many input gates 27 as there are circulating registers in the block (24). The gates have a common information input line bus 26 and selection inputs 28. There are an equal number of output gates 30, each of which is separately controlled from a separate control input 31 and all outputs from the gates 30 are connected to a common output line bus 29.

The arrangements shown in FIGS. 10 and 11 are concerned primarily with serially coded information. Each one of the circulating or recirculating registers actually receives a sequence of information bits in an information work comprised of as many bits as there are turns or pitches in the magnetic helical path of each register. They may be directly controlled for parallel coded information by abandonment of bus lines for the input and output of information bits and then an information word comprises as many bits as are registers in a block (or sub-assembly of a block, as the case may be).

However, and according to a further feature of the invention, the register structures may be arranged to provide at least part of the read-in and read-out selection means for a multi-register store. An example of such a modified register is shown in FIG. 12. In this figure, only the ends of the register member are shown, the memorization magnetic path proper either single or paired paths for circulation or recirculation being located between the locations marked Re and Rs. Part 16 of the previously described structure comprises several turns of the magnetic helical path, in this instance three, and three "input" conductors are respectively coupled to these three additional turns. The first conductor 18 (*a*) is the read-in conductor proper, the two others marked 41(i) and 42(*c*), respectively, are authorization or inhibition conductors which, depending upon their voltage, either authorize or inhibit the progression of any information bit formed by activating 18 into the circulating magnetic helical path from Re to Rs. Such conductors are transversally arranged with respect to the turns, which implies that the turns are of substantial slant, i.e., 20° to 40° with respect to the axis of the helix. This condition may be easily met as such additional turns may be provided with a slant, higher than that of the turn of the circulating register path proper (additionally, said additional turns may have a width higher than that of the turns in said path). Of course, other arrangements such for instance as those previously described for the read-in conductor 18 may be used for each of the additional conductors 41 and 42 as well as for 18, in which case discrimination in slant and width of the additional turns with respect to the register path proper is unnecessary. The operation may be explained as follows:

Let us consider a cycle $t_0$ during which conductor 18 is activated for recording a "1" binary digit by reversal of the orientation of the magnetization vector in the material of the helix turn with which it is coupled. Normally, as the rotating magnetic field is applied, this information bit would progress so that at the next cycle $t_1$ of the applied field, the reversed magnetization zone would have reached a location under conductor 41 (*b*). Assuming that the latter conductor is not activated, the zone progresses again and reaches a location under conductor 42 (*c*) at the next cycle $t_2$ of progression of information in the register. Assuming further that conductor 42(*c*) is not activated, the information bit will enter the circulating helical path proper. On the other hand, if one or both of the conductors 41(*b*) and 42(*c*) had been activated by a current of opposite direction to that of the read-in current in 18 when the reversed oriented zone passes under such an activated conductor, the effect of the current is to erase the information bit by reestablishing the "O" orientation of the magnetization vector at that point on the magnetic path. This arrangement therefore permits having a store in which the same information bit is simultaneously applied to a number of register input and in which the selection of a single register to which said information bit is coupled after a prior read-in of the said bit in said plurality of register inputs. An illustrative embodiment is shown in FIG. 13.

Referring again to FIG. 12, the other "end" of the register, 17, is also provided with three additional helical turns and three coupled conductors, i.e., 44(*d*), 43(*e*) and 19(*f*), the latter being the read-out conductor proper and the two first being control conductors to either authorize or inhibit the actual read-out of an information bit by 19, by letting the magnetization zone of reversed orientation progress up to the last turn or erasing it at least one of the two preceding helical turns. Although the controlled selection read-in and read-out arrangements are shown as having the same number of control elements, it is apparent that this is not imperative and obviously the use of two control conductors is also merely illustrative as the number may be other than two when necessary.

FIG. 13, as stated above, shows an embodiment using register structures of the type shown in FIG. 12. The store comprises four times *n* registers. Otherwise stated, a block such as (24) comprises 4*n* registers which for selection purposes are grouped in 4 sub-groups I, II, III and IV. Each one of the read-in conductors, $a_1$ to $a_n$, is coupled to four register inputs, one in each of the said sub-groups I to IV. Similarly, each read-out conductor from $f_1$ to $f_n$ is coupled to the output ends of four registers, one in each of the said sub-groups I to IV, in order to correspond to the read-in conductors $a_1$ to $a_n$.

Four bistable control circuits are shown, Band C for a read-in selection and D and E for a read-out selection. In a store when it is imperative that any read-in operation is concomitant with a corresponding read-out, B and D will be a single bistable control circuit, and C and E will also be a single bistable control circuit. In the case of recirculating register stores, the two operations are not necessarily linked; the four control circuits are therefore shown separately. Of course, what is intended hereby "bistable control circuit" is any circuit which, until it is re-set, will present and maintain one of two distinct conditions of its output. For the sake of clarity, the example is concerned with circuits of the bistable flip-flop type so that positive and negative outputs may be easily discriminated as always being in either opposite or "complementary" conditions. When one output is at a higher level, the other one is at its lower level and vice versa. In such conditions, positive output of circuit B is connected to a conductor b+ which is actually the conductor 41 of all the registers in sub-groups I and II. The negative output of circuit B is connected to a conductor b− which is the conductor 41 of all the registers in sub-groups III and IV. The positive output of circuit C is connected to a conductor *c*+ which is the conductor 42 of all the registers in sub-groups I and III and the negative output of C is connected to a conductor *c*− which is the conductor 42 of all the registers in sub-groups II and IV. It will be apparent that when one or more than one sequence of information signals are applied to one or more of the read-in conductors form $a_1$ to $a_n$ , effective read-in could only be made in one of the sub-groups of registers since, at any given time, only in one of the sub-groups will both the conductors 41 and 42 be in a condition authorizing the actual progression of the bits to the circulating helical paths proper. In the other sub-groups erasure will occur either from conductors 41 and/or from conductors 42.

Similarly, the positive output of circuit D is connected to a conductor $d+$ which is the conductor 44 of all registers in sub-groups I and II and the negative output of D is connected to a conductor $d-$ which is the conductor 44 of all registers in sub-groups III and IV. The positive output of circuit E is connected to a conductor $e+$ which is the conductor 43 of all registers in sub-groups I and III and the negative output of E is connected to a conductor $e-$ which is the conductor 43 of all registers in sub-groups II AND IV. Here again, the selection check will be apparent.

For simultaneous operation of read-in and read-out in a sub-group, the circuits B and D and the circuits C and E will be simultaneously controlled.

Such an organization of selection in a store may further be used for simultaneous introduction of $p$ words of $n$ bits in a sub-group, by mere application of the successive bit signals of such words on the inputs $a_1 \ldots a_n$. It may also serve to introduce $n$ words of $p$ bits sequentially and in a single read-in operation. The read-out operations may be similarly controlled. Obviously, these examples are not intended to be limiting on the possibilities of control of these stores.

With an extra control conductor and a corresponding extra turn of the helix in each of the registers, and an additional control bistable circuit, the store may be subdivided into eight sub-groups, and so forth.

I claim:

1. In a binary coded information store, the combination of a magnetic domain circulating register comprising a helical path of an anisotropic magnetic film having its easy magnetization axis substantially perpendicular to the direction of the geometrical axis of said helical path, and means for applying to said register a continuously rotating magnetic field of uniform value and having its axis of rotation parallel to the longitudinal axis of said helical path.

2. The combination according to claim 1, wherein said film comprises two superimposed and relatively insulated helical paths of identical value and reversed pitch direction, the magnetic materials of said superimposed helix paths contacting one another closely at both ends thereof.

3. The combination according to claim 1, wherein said circulating magnetic register comprises two parallel arranged helices of identical value and reversed pitch direction, respectively carried on distinct and parallel carriers, the end turns of said helices being closely magnetically coupled.

4. The combination according to claim 1 wherein further means are provided for selectively controlling the application to said register of an alternating magnetic field for inhibiting the progression of information bits from said rotating magnetic field along said helical path.

5. The combination according to claim 4 wherein said further means includes an electrical conductor arranged substantially along the axis of said helical path and means for applying alternating current thereto.

6. The combination according to claim 4 wherein said further means includes an electrical conductor extending substantially in close proximity to said helical path and parallel to a generant thereof, and means for applying alternating current to said conductor.

7. The combination according to claim 1 further including means for applying a D.C. value magnetic field of restricted value to said helical path.

8. The combination according to claim 7 wherein said means includes an electrical conductor extending substantially along the axis of said helical path and means for applying a controlled value direct current thereto.

9. The combination according to claim 7 wherein said means includes an electrical conductor oriented along a generant of said helical path and in close proximity thereto, and means for applying a controlled value of direct current to said conductor.

10. The combination according to claim 1, wherein said helical path of anisotropic magnetic film is carried by an elongated polished surface on an at least substantially non-magnetic body, the longitudinal axes of said body and said helix film being substantially coincident.

11. The combination according to claim 10, wherein said film comprises a helical coating on the said polished surface of said body.

12. The combination according to claim 10, wherein said film comprises a uniform magnetic film coating a helical aluminum layer on the said polished surface of said body.

13. The combination according to claim 10, wherein said film comprises a soft magnetic film uniformly coated over the surface of said body, an insulating film helix over the surface of said soft magnetic film and a film of hard ferromagnetic material coating the exposed surfaces of said soft magnetic film and said helix insulating film.

14. The combination according to claim 10, wherein said body includes at least one electrical conductor arranged substantially along the axis thereof.

15. The combination according to claim 14, wherein said body is insulating and hollow and said electrical conductor consists of an inner coating on said hollow body.

16. The combination according to claim 10, wherein at least one control conductor is coupled to at least one end turn of said helical path at one end thereof and wherein at least one read-out conductor is inductively coupled to at least one end turn of said helical path at the other end thereof.

17. The combination according to claim 16, wherein each one of such end turns is of enlarged width compared to the other turns of said helical path.

18. A binary coded information store comprising in combination: a plurality of elementary magnetic domain circulating registers, each comprising a helical path of anisotropic magnetic film having its easy axis of magnetization oriented substantially perpendicular to the axis of said helical path, said registers being grouped in a bunch with their helical axes in parallel relation; and means for generating a continuously rotating magnetic field of substantially constant value in said bunch, said rotating magnetic field rotating around an axis parallel to the axis of said registers.

19. A binary coded information store according to claim 18 wherein means are provided for selective application to the registers in said store of alternating magnetic fields inhibiting progression of information therein.

20. A binary coded information store according to claim 18 wherein part at least of said circulating registers are re-circulating registers having looped magnetic helical path circulating circuits.

21. A binary coded information store according to claim 18 including means in conjunction with each one of said elementary circulating registers for assuring read-in and read-out of information bits, and means for selective interrogation of said read-in and read-out means.

22. A binary coded information store according to claim 21, wherein said elementary register read-in means each includes a read-in conductor magnetically coupled to an end turn of the magnetic film helical path of said register, and said elementary register read-out means also comprises a read-out conductor magnetically coupled to another end path turn of said magnetic film helical path.

23. A binary coded information store according to claim 22 wherein each one of said read-in conductors and each one of said read-out conductors are respectively connected to distinct outputs and distinct inputs of respective external read-in and read-out selective organizations.

24. A binary coded information store according to claim 22, wherein each of said elementary registers includes means for inhibiting progession of information bits therein in response to the presence of an alternating magnetic field, and including means for applying such alternating magnetic fields from a selective distribution of alternating current to said register progression inhibiting means, at least one bus information input line for the read-in conductors in said registers, at least one bus information output line for the read-out conductors in said registers, and means for selectively applying the said alternating current to any unselected register in a read-in or read-out operation including application to, respectively routing of, input and output information signals to and from said bus lines.

25. A binary coded information store according to claim 24, including means for re-application of read-out signals to the input bus information line in said store.

26. A binary coded information store comprising in combination:

a. a plurality of elementary circulating registers, each comprising an anisotropic magnetic film arranged in the form of a helix and having its easy access of magnetization oriented substantially perpendicularly to the axis of said helix, said registers being arranged in groups with the axes of the helices parallel to one another;
b. means for generating in each said group a continuously rotating magnetic field of substantially constant value with its axis of rotation parallel to the axes of said helices;
c. read-in means for each register comprising at least one conductor magnetically coupled to a first end turn of said helix;
d. read-out means for each register comprising at least one conductor magnetically coupled to the other end turn of said helix;
e. means for selectively interrogating said read-in and read-out means;
f. a first plurality of control conductors for each register, each magnetically coupled to a turn of said helix following said first end turn;
g. a second plurality of control conductors for each register, each magnetically coupled to a turn of said helix preceding said other end turn; whereby selective application of a demagnetizing current to said control conductors inhibits progression of an information bit in any helix which would otherwise occur due to said continuously rotating magnetic field;
h. a first bus line joining said read-in conductors;
i. a second bus line joining said read-out conductors;
j. selective control members for selectively activating said registers; and
k. means interconnecting said control conductors and said selection control members in order to select circulating registers in each group having common read-in and read-out bus lines in accordance with the selective activation of said registers by said selection control members.

27. A binary coded information store according to claim 26 wherein said common information bus lines define rows and said further control conductors and control members define columns in a thus electrically arranged matrix of magnetic circulating registers.

* * * * *